United States Patent
Hara et al.

(10) Patent No.: US 10,926,862 B2
(45) Date of Patent: Feb. 23, 2021

(54) INSERTION SHEET BETWEEN HIGH-TEMPERATURE DUCT AND STRUCTURAL MEMBER OF AIRCRAFT, DUCT OF AIRCRAFT, AND AIRCRAFT

(71) Applicant: MITSUBISHI AIRCRAFT CORPORATION, Aichi (JP)

(72) Inventors: Nobuhide Hara, Tokyo (JP); Tadahiko Suzuta, Tokyo (JP); Hideyuki Kudo, Tokyo (JP); Takuo Oda, Tokyo (JP); Toshiyuki Umemoto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 826 days.

(21) Appl. No.: 15/381,316

(22) Filed: Dec. 16, 2016

(65) Prior Publication Data

US 2017/0183083 A1    Jun. 29, 2017

(30) Foreign Application Priority Data

Dec. 25, 2015 (JP) .............................. JP2015-253773

(51) Int. Cl.
*B64C 1/40* (2006.01)
*B64D 13/00* (2006.01)

(52) U.S. Cl.
CPC .............. *B64C 1/406* (2013.01); *B64D 13/00* (2013.01); *Y02T 50/40* (2013.01); *Y02T 50/50* (2013.01)

(58) Field of Classification Search
CPC ......... Y02T 50/56; B64C 1/406; B64D 13/00; B64D 45/02; F16L 59/06; F16L 59/12;

(Continued)

(56) References Cited

U.S. PATENT DOCUMENTS

| 1,684,396 | A | * | 9/1928 | Hinneken | ............. | F16L 23/032 |
| | | | | | | 285/414 |
| 2,366,442 | A | * | 1/1945 | Cunningham | ........ | F16L 41/086 |
| | | | | | | 285/200 |

(Continued)

FOREIGN PATENT DOCUMENTS

| EP | 3617577 A1 * | 3/2020 | ................ F16L 5/10 |
| JP | S51-130153 U | 10/1976 | |

(Continued)

OTHER PUBLICATIONS

Japanese Office Action for Application No. 2015-253773 dated Nov. 5, 2019.

*Primary Examiner* — David Bochna
(74) *Attorney, Agent, or Firm* — Pearne & Gordon LLP

(57) ABSTRACT

Temperature of a structural member is maintained at allowable temperature or less by suppressing heat transfer from a high-temperature duct to the structural member. An insertion sheet according to the present invention is inserted between a flange and a partition panel. The flange is provided on a bleed duct and is fastened to the partition panel. The bleed duct penetrates through a partition wall of an aircraft. The insertion sheet includes first parts and a second part. The first parts are disposed near respective shafts of rivets provided at a plurality of positions of the insertion sheet. The second part extends among the first parts. The first parts bear a load of fastening, and the second part has thermal conductivity lower than thermal conductivity of the first parts.

12 Claims, 13 Drawing Sheets

(58) Field of Classification Search
CPC ..... F16L 59/121; F16L 59/135; F16L 59/168; F16L 59/184; F16L 23/032; F16L 23/0286; F16L 23/028
USPC ......... 285/56, 139.1, 47, 904; 277/597, 605, 277/645
See application file for complete search history.

(56) References Cited

U.S. PATENT DOCUMENTS

| | | | | | |
|---|---|---|---|---|---|
| 2,441,009 | A | * | 5/1948 | Cunningham | F16L 41/086 285/200 |
| 2,752,579 | A | * | 6/1956 | Caldwell | F16L 25/023 277/614 |
| 3,191,950 | A | * | 6/1965 | Hiltner | F16J 15/122 277/611 |
| 3,227,475 | A | * | 1/1966 | Sinkinson | B64D 13/00 285/9.2 |
| 3,655,210 | A | * | 4/1972 | Farnam | F16J 15/104 277/597 |
| 3,777,501 | A | * | 12/1973 | Sharp | F16L 59/141 62/50.7 |
| 3,811,689 | A | * | 5/1974 | Farnam | F16J 15/104 277/637 |
| 3,863,936 | A | * | 2/1975 | Farnam | F16J 15/123 277/597 |
| 3,941,640 | A | * | 3/1976 | Farnam | F02M 19/00 156/252 |
| 4,072,316 | A | * | 2/1978 | Decker | F16J 15/064 277/597 |
| 4,291,905 | A | * | 9/1981 | Schrock | F16L 5/02 248/56 |
| 4,553,561 | A | * | 11/1985 | Morris | E03F 5/12 137/357 |
| 4,756,561 | A | * | 7/1988 | Kawata | F01N 13/1827 277/592 |
| 4,911,972 | A | * | 3/1990 | Mercuri | B32B 15/14 428/99 |
| 5,054,793 | A | * | 10/1991 | Hauenstein | F01N 13/1827 277/313 |
| 5,951,059 | A | * | 9/1999 | Kitamura | F16L 5/02 285/124.4 |
| 6,173,997 | B1 | * | 1/2001 | Nordstrom | F16L 5/06 285/139.1 |
| 6,979,028 | B2 | * | 12/2005 | Muroi | F16L 27/1012 285/223 |
| 7,622,178 | B2 | * | 11/2009 | Bogue | B29C 73/04 285/15 |
| 7,934,753 | B2 | * | 5/2011 | De Buhr | B64D 11/04 244/131 |
| 8,894,014 | B2 | * | 11/2014 | Yonezawa | B64D 45/02 244/135 R |
| 8,947,846 | B2 | * | 2/2015 | Courpet | B64D 45/02 361/215 |
| 8,987,612 | B2 | * | 3/2015 | Callahan | F16B 5/0258 174/653 |
| 9,061,768 | B2 | * | 6/2015 | Hansom | B64D 37/005 |
| 9,279,531 | B2 | * | 3/2016 | Parkin | F16L 55/00 |
| 9,671,023 | B2 | * | 6/2017 | Boyd | F16J 15/061 |
| 9,920,859 | B2 | * | 3/2018 | Perrigo | F16L 5/00 |
| 10,293,952 | B2 | * | 5/2019 | James | B64D 37/04 |
| 2005/0089661 | A1 | * | 4/2005 | Hogenson | B64G 1/14 428/36.5 |
| 2006/0006611 | A1 | * | 1/2006 | Foerg | A62C 2/065 277/602 |
| 2013/0195658 | A1 | | 8/2013 | Saito et al. | |
| 2014/0356571 | A1 | | 12/2014 | Watanabe et al. | |
| 2015/0267846 | A1 | * | 9/2015 | Irwin | F16L 5/06 285/194 |
| 2016/0102793 | A1 | * | 4/2016 | Shimizu | F16L 23/02 285/368 |

FOREIGN PATENT DOCUMENTS

| | | |
|---|---|---|
| JP | S58-153785 U | 10/1983 |
| JP | S59-008198 U1 | 1/1984 |
| JP | S59-62600 U | 4/1984 |
| JP | S60-149585 U | 10/1985 |
| JP | H08-183590 A | 7/1996 |
| JP | 2003-176923 A | 6/2003 |
| JP | 2012-046151 A | 3/2012 |
| KR | 10-2015-0019658 A | 2/2015 |
| WO | 2013/108796 A1 | 7/2013 |

* cited by examiner

INSERTION SHEET BETWEEN HIGH-TEMPERATURE DUCT AND STRUCTURAL MEMBER OF AIRCRAFT, DUCT OF AIRCRAFT, AND AIRCRAFT

BACKGROUND OF THE INVENTION

Field of the Invention

The present invention relates to a sheet used in a fastening part of a structural member of an aircraft and a duct through which a high-temperature fluid such as bleed air flows, a duct of an aircraft through which a high-temperature fluid flows, and an aircraft.

Description of the Related Art

Bleed air from an engine or an auxiliary power unit of an aircraft flows through a bleed duct provided in an airframe and is then supplied to an air conditioner, an anti-icing device, and the like (Japanese Patent Laid-Open No. 2012-046151).

The bleed duct is arranged in a predetermined path and penetrates through a structural member such as a partition wall that is placed in the middle of the path. A flange provided in the bleed duct and a peripheral edge of a hole of the structural member through which the bleed duct passes are fastened by a rivet and the like at a part where the bleed duct penetrates through the structural member.

Heat of high-temperature bleed air flowing through the duct is transferred from the flange to the structural member at the part where the flange of the bleed duct and the structural member are fastened.

An object of the present invention is to maintain temperature of the structural member at allowable temperature or less by suppressing heat transfer from the duct to the structural member.

SUMMARY OF THE INVENTION

An insertion sheet according to the present invention is inserted between a flange of a duct and a structural member of an aircraft fastened to the flange. The duct penetrates through the structural member and allows a fluid at temperature higher than allowable temperature of the structural member to flow inside the duct. The insertion sheet includes: first parts that are disposed near respective insertion holes into which fastening members are respectively inserted, the fastening members provided at a plurality of positions in the insertion sheet; and a second part that extends among the first parts.

The first parts bear a load of fastening, and the second part has thermal conductivity lower than thermal conductivity of the first parts.

According to the present invention, the first parts requiring rigidity for bearing the load of the fastening are disposed near the respective insertion holes into which the fastening members are inserted, and the second part other than the first parts is formed of a material having the thermal conductivity lower than the thermal conductivity of the first parts. This makes it possible to reduce thermal conductivity of the entire insertion sheet and to accordingly provide sufficient thermal resistance between the flange of the duct and the structural member.

Each of the first parts according to the present invention may preferably have a cylindrical shape, and an inner periphery of each of the first parts may preferably form an inner wall of each of the insertion holes.

The second part of the insertion sheet according to the present invention may preferably include an airgap.

The second part of the insertion sheet according to the present invention may be preferably made of a felt in a sheet shape.

In the present invention, when the airgap of the second part is sealed by a resin or the like to seal the gap between the flange and the structural member, the insertion sheet according to the present invention may be used at a fastening position requiring airtightness.

The insertion sheet according to the present invention may preferably include a third part that is continuous over an entire circumference of the flange, and is tightly fitted to the flange and the structural member on inner peripheral side than the first parts. The insertion sheet may be used at the fastening position requiring airtightness.

An insertion sheet according to the present invention is inserted between a flange of a duct and a structural member of an aircraft fastened to the flange. The duct penetrates through the structural member and allows a fluid at temperature higher than allowable temperature of the structural member to flow inside the duct. The insertion sheet includes a honeycomb structure that is configured of an aggregate of cells each having a polygonal cross-sectional surface.

According to the present invention, the honeycomb structure makes it possible to provide a hollow part while securing rigidity withstanding a load of fastening. This allows for reduction of thermal conductivity by the hollow part, thereby providing sufficient thermal resistance between the flange and the structural member.

The insertion sheet according to the present invention may preferably include a sealing part that is continuous over an entire circumference of the flange on the inner peripheral side than the first parts and the second part, and is tightly fitted to the flange and the structural member.

According to the present invention, the sealing part makes it possible to provide a sealing function to the insertion sheet.

Further, an insertion sheet according to the present invention is inserted between a flange of a duct and a structural member of an aircraft fastened to the flange. The duct penetrates through the structural member and allows a fluid at temperature higher than allowable temperature of the structural member to flow inside the duct. The insertion sheet includes: first parts that are disposed near respective insertion holes into which fastening members are respectively inserted, and bear a load of fastening, the fastening members provided at a plurality of positions in the insertion sheet; and a sealing part that is continuous over an entire circumference of the flange on inner peripheral side than the insertion holes, and is tightly fitted to the flange and the structural member. Each of the first parts projects outward from an outer peripheral edge of the sealing part in a radial direction, and the first parts include an airgap thereamong.

The insertion sheet according to the present invention includes the first parts bearing the load of the fastening and the annular sealing part that is tightly fitted to the flange and the structural member on the inner peripheral side than the insertion holes. The flange and the structural member have an airgap including the part among the first parts therebetween, on the outer peripheral side than the sealing part.

According to the present invention, it is possible to provide sufficient thermal resistance between the flange and the structural member by the airgap existing between the flange and the structural member while bearing the load of the fastening by the first parts and sealing the gap between the flange and the structural member by the sealing part that extends among the first parts.

An insertion sheet according to the present invention is inserted between a holding member provided on a duct and a structural member of an aircraft fastened to the holding member. The holding member holds the duct to the structural member, and the duct allows a fluid at temperature higher than allowable temperature of the structural member to flow inside the duct. The insertion sheet includes: first parts that are provided at one or more positions of the insertion sheet, and are disposed near respective insertion holes into which fastening members are respectively inserted; and a second part disposed around the first parts. The first parts bear a load of fastening, and the second part has thermal conductivity lower than thermal conductivity of the first parts.

An insertion sheet according to the present invention is inserted between a holding member provided on a duct and a structural member of an aircraft fastened to the holding member. The holding member holds the duct to the structural member, and the duct allows a fluid at temperature higher than allowable temperature of the structural member to flow inside the duct. The insertion sheet includes a honeycomb structure that is configured of an aggregate of cells each having a polygonal cross-sectional surface.

A duct according to the present invention penetrates through a structural member of an aircraft and allows a fluid at temperature higher than allowable temperature of the structural member to flow inside the duct. The duct includes a fastening section that extends from an outer periphery of the duct toward the structural member and is fastened to the structural member. The fastening section includes a distal end portion at which the fastening section is fastened to the structural member, and a proximal end portion that is continuous to the outer periphery of the duct at a position separated from the distal end portion in an axial direction of the duct.

According to the present invention, the fastening section provided in the duct provides a thermal transfer path longer than the flange, which makes it possible to sufficiently suppress heat transfer to the structural member.

A duct according to the present invention penetrates through a structural member of an aircraft and allows a fluid at temperature higher than allowable temperature of the structural member to flow inside the duct. The duct includes: a flange fastened to the structural member; and an annular wall body that extends from an upstream side to a downstream side of the flange in a flowing direction of the fluid on inner side of an inner periphery of the duct. The wall body includes an upstream portion and a downstream portion, the upstream portion is continuous to the inner periphery on the upstream side of the flange, and the downstream portion is continuous to the inner periphery on the downstream side of the flange. The wall body and the inner periphery include a sealed gap therebetween.

According to the present invention, the gap between the wall body and the inner periphery of the duct functions as a heat insulation layer to cause the heat of the high-temperature fluid flowing though the duct, to reach the flange through the wall body and an outer wall of the duct. This makes it possible to provide sufficient thermal resistance between the duct and the structural member.

A duct according to the present invention penetrates through a structural member of an aircraft and allows a fluid at temperature higher than allowable temperature of the structural member to flow inside the duct. The duct includes: a flange fastened to the structural member; and an annular wall body that extends from an upstream side to a downstream side of the flange in a flowing direction of the fluid. The wall body is supported in a cantilever manner by an inner periphery of the duct on one of the upstream side and the downstream side of the flange, and is open without being surrounded by the duct on the other of the upstream side and the downstream side of the flange.

According to the present invention, the heat of the high-temperature fluid flowing through the duct reaches the flange through the wall body and the outer wall of the duct. This makes it possible to provide sufficient thermal resistance between the duct and the structural member.

An aircraft according to the present invention includes: any of the above-described insertion sheets; a structural member; and a duct. The duct may preferably be any of the above-described ducts.

An aircraft according to the present invention includes: any of the above-described ducts; and a structural member.

According to the present invention, suppressing heat transfer from the duct to the structural member makes it possible to maintain the temperature of the structural member at the allowable temperature or less.

DETAILED DESCRIPTION OF THE PREFERRED EMBODIMENTS

Some embodiments of the present invention are described below with reference to accompanying drawings.

First Embodiment

Figure 1:
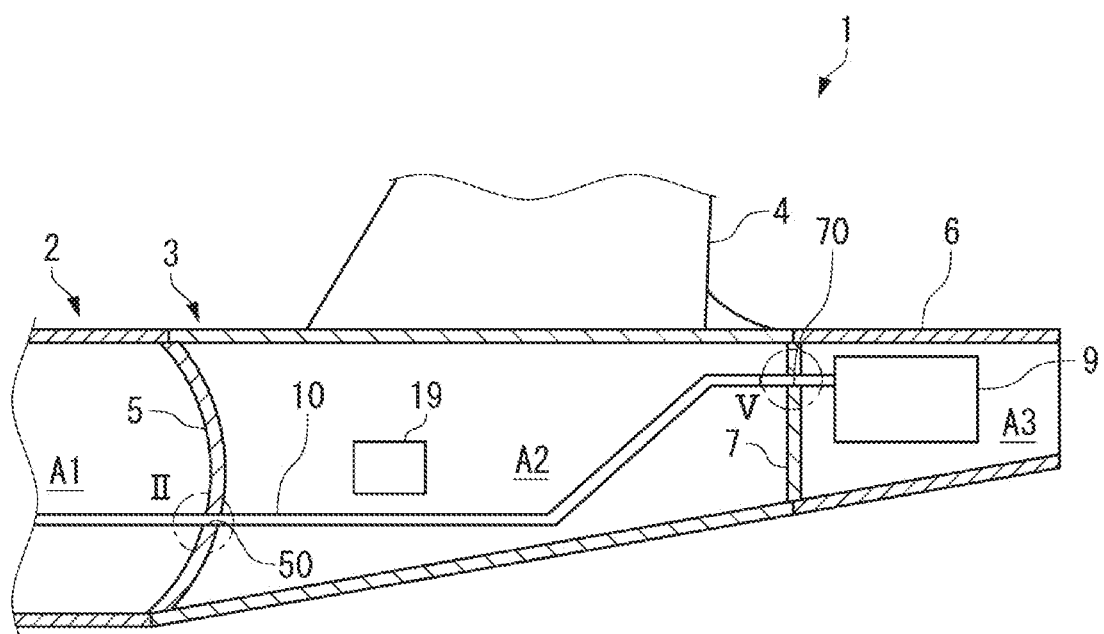
FIG. 1 is a vertical cross-sectional diagram schematically illustrating a rear fuselage rear part of an aircraft according to a first embodiment.

A fuselage 2 of an aircraft 1 illustrated in FIG. 1 includes an unillustrated front fuselage that is located on nose side, and a rear fuselage 3 that is located on tail side. The rear fuselage 3 is provided with a vertical stabilizer 4.

An airframe of the aircraft 1 includes a main wing and a horizontal stabilizer that are not illustrated, in addition to the fuselage 2 and the vertical stabilizer 4. Structural members configuring the airframe are each formed of a material having a large specific strength, such as an aluminum alloy and a fiber reinforced resin.

A pressure partition wall 5 is provided inside the rear fuselage 3. The pressure partition wall 5 partitions a pressurized section A1 and an unpressurized section A2. The pressurized section A1 includes a cabin, a cargo, a flight deck, and the like that are located in front of the pressure partition wall 5. The unpressurized section A2 is located behind the pressure partition wall 5.

A rear part of the rear fuselage 3 is so formed as to become gradually thin toward a rear end, and a tail cone 6 is provided at the rear end of the rear fuselage 3. An auxiliary power unit (APU) 9 that is used as a power source of the aircraft 1 mainly in parking is housed in the tail cone 6.

The unpressurized section A2 in the rear fuselage 3 and an APU room A3 in the tail cone 6 are partitioned by a partition wall 7. Various equipment 19 (one of them is illustrated) is provided in the unpressurized section A2.

High-temperature high-pressure bleed air that is extracted from the auxiliary power unit 9 is supplied, through a bleed duct 10, to an air conditioner, an anti-icing device, and the like that are not illustrated and provided in front of the pressure partition wall 5. The bleed duct 10 penetrates through the partition wall 7 and the pressure partition wall 5, and is arranged toward front side.

In addition to the bleed duct 10, members such as other ducts and wirings that are omitted in illustration penetrate through the partition wall 7 and the pressure partition wall 5.

First, a part where the bleed duct 10 penetrates through the partition wall 7 is described with reference to FIG. 2.

The partition wall 7 includes a partition panel 71 and a plurality of unillustrated ribs that reinforce the partition panel 71.

A through hole 70 that penetrates through the partition panel 71 in a thickness direction is provided in the partition panel 71. The bleed duct 10 passes through the through hole 70.

The partition panel 71 is formed of a metal material such as an aluminum alloy. Alternatively, the partition panel 71 may be formed of a fiber reinforced resin that contains carbon fiber as reinforcing fiber. The partition panel 71 has a thickness of, for example, several millimeters.

The bleed duct 10 includes a cylindrical duct body 11 and flanges 12. Each of the flanges 12 projects outward from an outer periphery 11A of the duct body 11 in a radial direction and is fastened to the partition panel 71. Each of the flanges 12 is formed in an annular shape.

The duct body 11 and the flanges 12 are each formed of a metal material such as stainless steel.

The outer periphery of the duct body 11 is covered with an unillustrated heat insulation material such as a felt.

Figure 2:
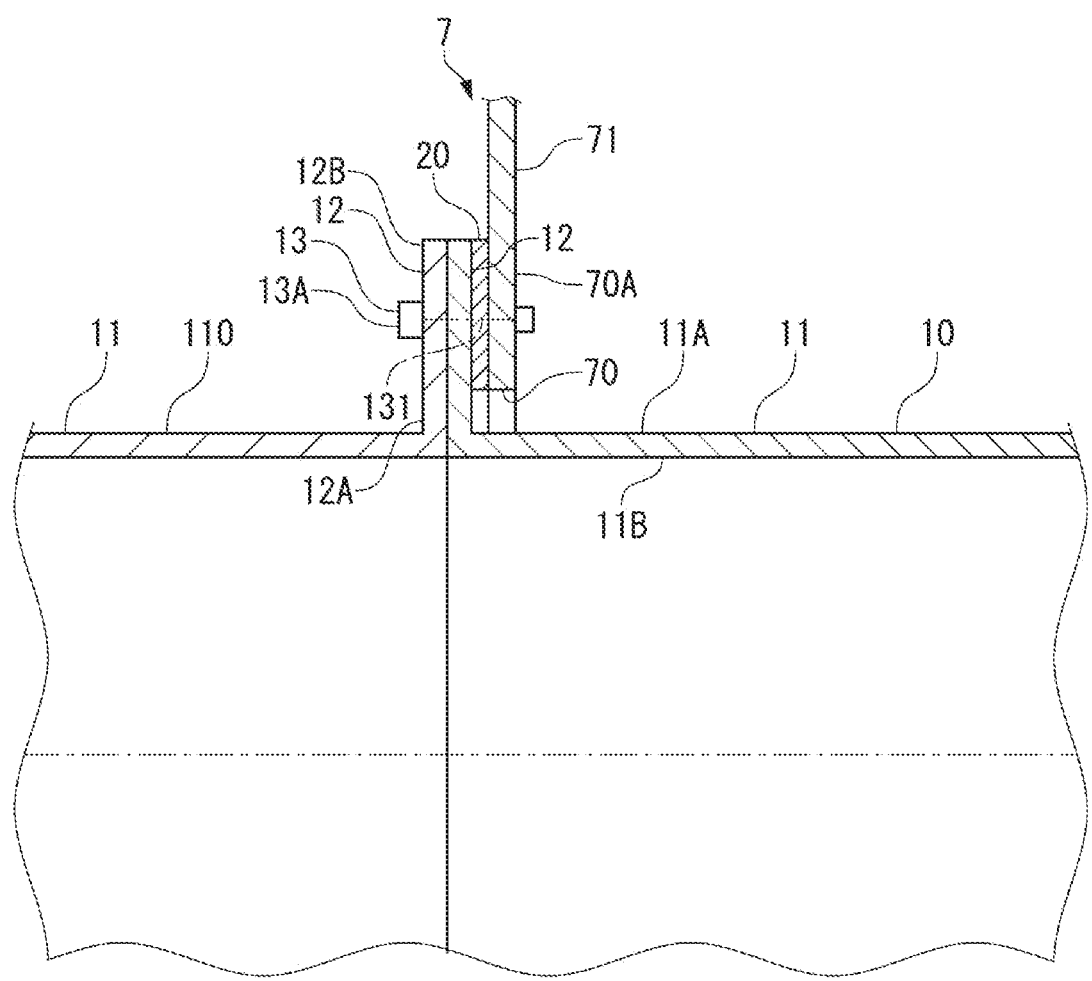
FIG. 2 is an enlarged view illustrating a part (denoted by II) in FIG. 1 where a bleed duct penetrates through a partition wall.

As illustrated in FIG. 2, the bleed duct 10 is configured of a plurality of pipes that are coupled with one another. The flanges 12 that are provided at respective ends of the duct bodies 11 serving as the pipes coupled with one another are abutted on each other and fastened by rivets 13.

The through hole 70 has a hole diameter slightly larger than a diameter of the duct body 11. The outer periphery 11A of the duct body 11 and an inner peripheral edge of the through hole 70 have a gap therebetween.

The flanges 12 abutted on each other are fastened, by the rivets 13, to a circumference 70A of the circular through hole 70 of the partition panel 71 at a plurality of positions in a circumferential direction. Each of the rivets 13 penetrates through the abutted flanges 12 and the partition panel 71.

An insertion sheet 20 is inserted between an end surface of the flange 12 and a surface of the partition panel 71.

The insertion sheet 20 that is favorably used at a fastening position not requiring airtightness is described below.

Figure 3:
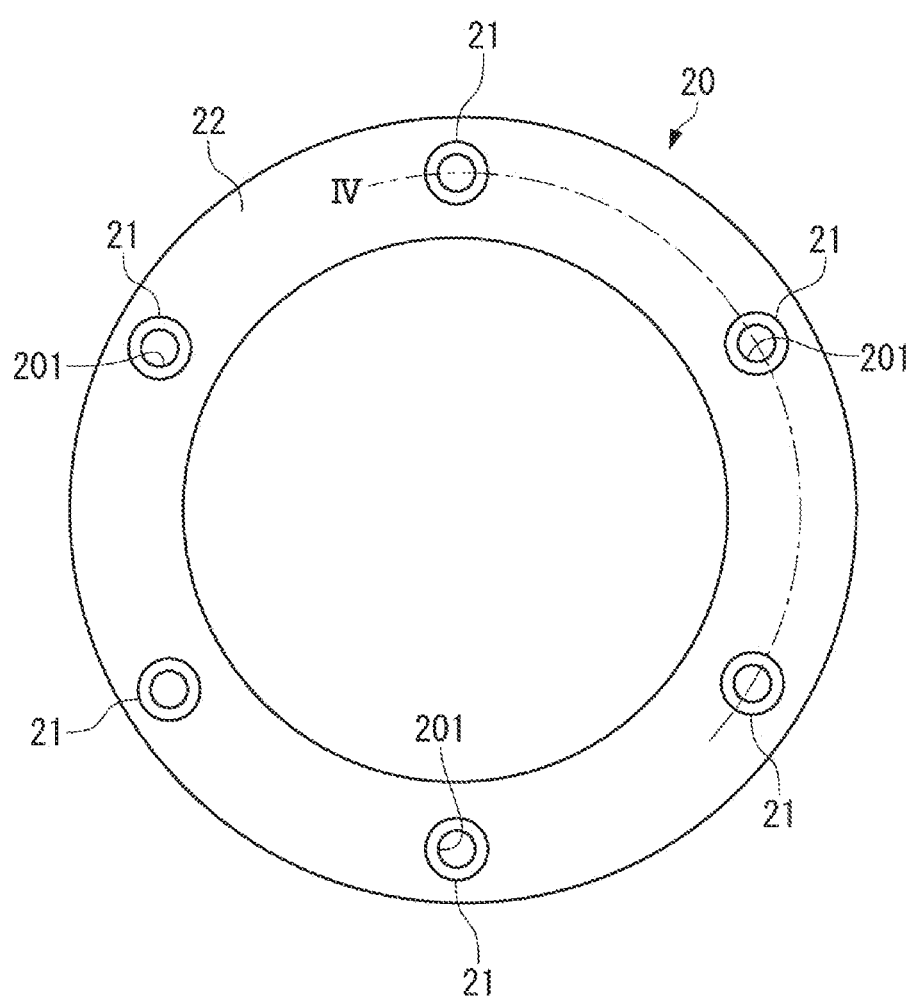
FIG. 3 is a plan view illustrating an insertion sheet used for fastening of the partition wall and a flange of the bleed duct.

As illustrated in FIG. 3, the insertion sheet 20 is formed in an annular shape. The insertion sheet 20 has a plurality of insertion holes 201 into which the respective rivets 13 (FIG. 2) are inserted.

The insertion sheet 20 may be formed to have a thickness of, for example, 1 millimeter to several millimeters.

The bleed air at temperature higher than the allowable temperature of the partition panel 71 flows inside the bleed duct 10. The heat of the bleed air is transferred from a peripheral wall of the bleed duct 10 to the flange 12, and then transferred from the flange 12 to the insertion sheet 20. The heat is further transferred to the partition panel 71 through the insertion sheet 20 and the rivets 13. Therefore, it is necessary to prevent the temperature of the partition panel 71 from exceeding the allowable temperature of the partition panel 71 due to such heat transfer.

Increasing the thickness of the partition panel 71 to increase the heat capacity in order to prevent local heat concentration to the partition panel 71 is difficult for the aircraft 1 because the aircraft 1 is restricted in weight from a viewpoint of fuel economy, etc. A pressure panel 51 (FIG. 5) described later has the same difficulty for the same reason.

The insertion sheet 20 provides thermal resistance between the flange 12 and the partition panel 71 that is enough to maintain the partition panel 71 at the allowable temperature or less. To provide large thermal resistance between the flange 12 and the partition panel 71 to reliably suppress the heat transfer, the insertion sheet 20 may be preferably disposed over the entire fastening region where the end surface of the flange 12 and the surface of the partition panel 71 face each other.

A sheet that is called a joint sheet or the like is typically disposed between the member and the flange of the duct through which a high-temperature fluid flows. Such a sheet may be formed by, for example, mixing inorganic particles into a fluorine-based resin material, followed by rolling and burning. Such a sheet has thermal resistance property withstanding the heat of the high-temperature fluid that is thermally transferred through the flanges.

Although various heat insulation materials such as glass wool and urethane foam suppress heat transfer from the flange 12 to the partition panel 71, it is difficult for such a flexible material to provide stable fastening pressure between the flange 12 and the partition panel 71.

The insertion sheet 20 disposed between the flange 12 and the partition panel 71 is desired to have rigidity for bearing of a load of fastening and for fastening at predetermined fastening pressure, in addition to low thermal conductivity. It is necessary that long-term stress relaxation under heating is small and fastening pressure is maintained for a long period of time by the insertion sheet 20.

Further, the insertion sheet 20 is desired to have a role of, for example, improving fitting between the end surface of the flange 12 and the surface of the partition panel 71 to stabilize the fastening seat surface, thereby preventing looseness of the fastening member, as with the joint sheet.

To provide thermal resistance between the flange 12 and the partition panel 71 and to secure rigidity withstanding the load of fastening, the insertion sheet 20 includes two parts 21 and 22 with different physical properties.

The insertion sheet 20 integrally includes a plurality of first parts 21 and a second part 22, and is wholly formed in a sheet shape. The plurality of first parts 21 bear the load of the fastening, and the second part 22 extends among the first parts 21.

The number of the first parts 21 provided is the same as the number of the insertion holes 201. The first parts 21 are provided near the respective insertion holes 201 into which a shaft 131 of the rivet 13 (FIG. 2) is inserted.

Figure 4:
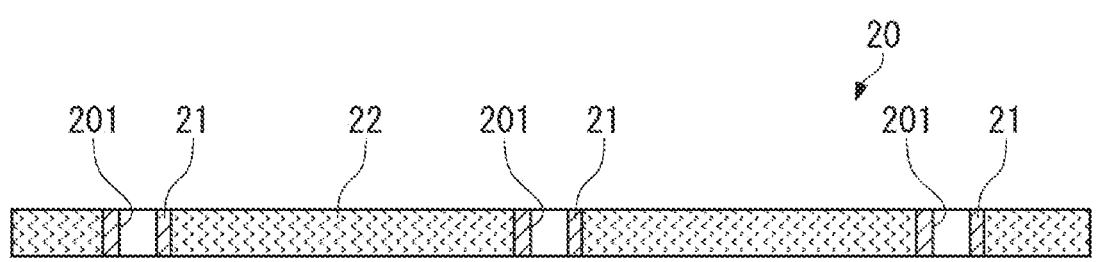
FIG. 4 is a cross-sectional diagram illustrating the insertion sheet that is cut along a line IV in FIG. 3 and developed.

As illustrated in FIG. 4, each of the first parts 21 is formed in a cylindrical shape having a height equal to the thickness of the insertion sheet 20, and the rivet 13 is inserted into each of the first parts 21. An inner periphery of the first part 21 forms an inner wall of the insertion hole 201.

The first part 21 according to the present embodiment is continuously formed over the entire circumference of the insertion hole 201; however, may be intermittently formed in the circumferential direction of the insertion hole 201.

An inner diameter and an outer diameter of the first part 21 are appropriately set in order to reliably bear the load of the fastening.

The first part 21 may be formed of an appropriate material that has thermal resistance property withstanding the heat of the bleed air and rigidity bearing the load of the fastening by the rivet 13.

The first part 21 according to the present embodiment is formed by mixing inorganic particles such as alumina particles into a fluorine-based resin material such as polytetrafluoroethylene (PTFE), followed by rolling and burning. For example, CLINSIL® commercially available from NICHIAS Corporation may be used as a material of the first part 21. The inorganic particles are added to the resin material in order to prevent creep deformation under heating.

The first part 21 may be preferably formed of a material that contains an appropriate resin material as a main component, in terms of thermal resistance property against the heat of the bleed air, the weight of the insertion sheet 20, and stability of the fastening seat surface.

The first part 21, however, may partially contain a metal material.

The first part 21 may be formed of a heat-resistant fiber of an inorganic material.

The second part 22 connects the plurality of first parts 21 so as to be inseparable from one another, and maintains the annular shape of the insertion sheet 20.

For example, a prepared hole that has a diameter smaller than the outer diameter of the first part 21 is provided in the annular second part 22, and the first part 21 is driven into the prepared hole, which allows for integration of the first part 21 and the second part 22.

It is unnecessary for the second part 22 to have the rigidity to bear the load of the fastening by the rivets 13.

Therefore, the second part 22 may be formed of a material that has thermal resistance property against the heat of the bleed air and low thermal conductivity capable of providing sufficient thermal resistance to maintain the partition panel 71 at the allowable temperature or less.

The second part 22 according to the present embodiment is formed of a felt that is obtained by fulling animal hair fibers such as wool and synthetic resin fibers. The felt fibers include a gap therebetween.

The second part 22 may be formed of a glass felt that is obtained by intertwining glass fibers through needling. The glass fibers of the glass felt includes a gap therebetween.

The thermal conductivity of the second part 22 is, for example, 0.1 W/(m·K) or less. The thermal conductivity of the second part 22 is lower than the thermal conductivity of the first part 21.

In addition, the second part 22 may be formed with use of a porous body of an inorganic material (such as silica). The porous body includes a lot of micropores. It is unnecessary for the second part 22 to have the rigidity to bear the load of the fastening and elasticity for the fastening. Therefore, a rigid material such as silica gel may be used for the second part 22 as long as the material connects the plurality of first parts 21 with one another through a holding member that holds the rigid material to maintain its shape and the material has the thermal conductivity lower than that of the first part 21. The material for the second part 22 is feely selectable with the main aim of low thermal conductivity.

An insertion sheet 30 that may be inserted between the flange 12 of the duct 10 and the partition panel 71 in place of the above-described insertion sheet 20 is described below.

The insertion sheet 30 provides thermal resistance between the flange 12 and the partition panel 71 that is enough to maintain the partition panel 71 at the allowable temperature or less. The insertion sheet 30 may be preferably disposed over the entire fastening region where the end surface of the flange 12 and the surface of the partition panel 71 face each other, in order to provide large thermal resistance between the flange 12 and the partition panel 71 to reliably suppress heat transfer.

It is necessary for the insertion sheet 30 disposed between the flange 12 and the partition panel 71 to have the rigidity for fastening at predetermined fastening pressure, in addition to low thermal conductivity.

Further, it is necessary for the insertion sheet 30 to seal a gap between the flange 12 and the partition panel 71 in order to maintain airtightness of the pressurized section A1.

Figure 5:
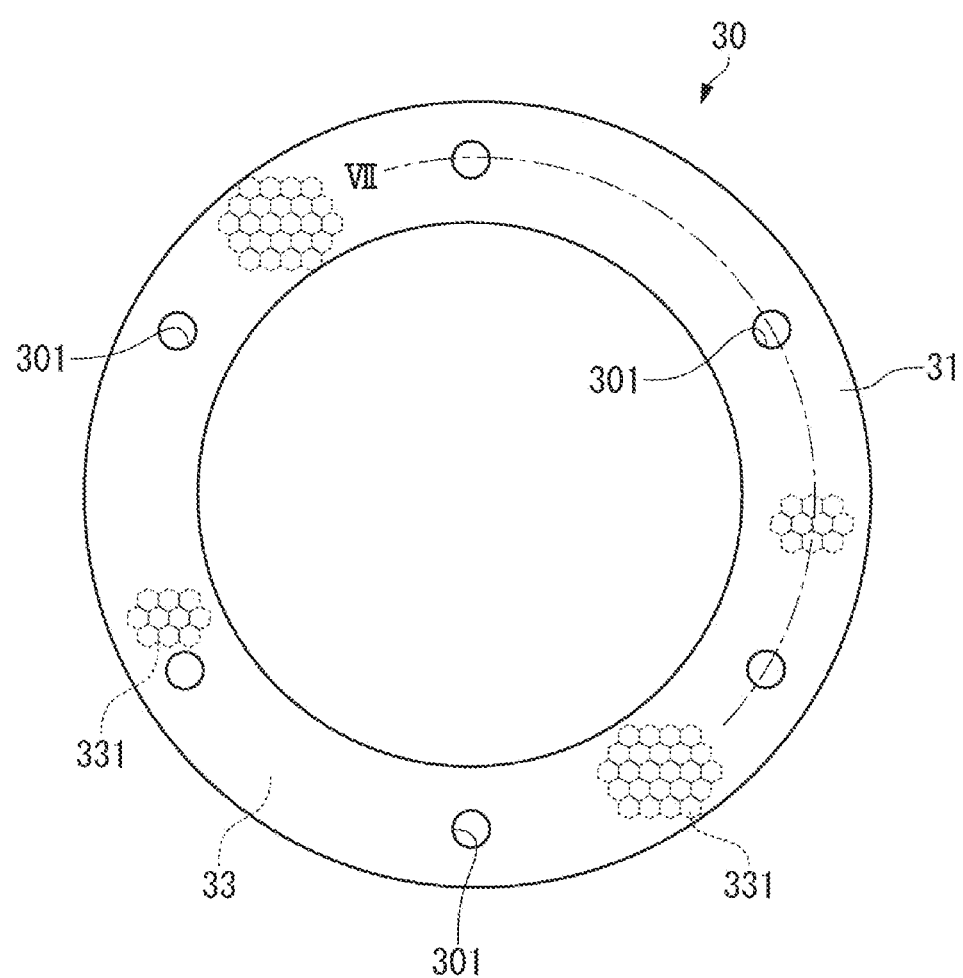
FIG. 5 is a plan view illustrating an insertion sheet used for fastening of a pressure partition wall and the flange of the bleed duct.
Figure 6:
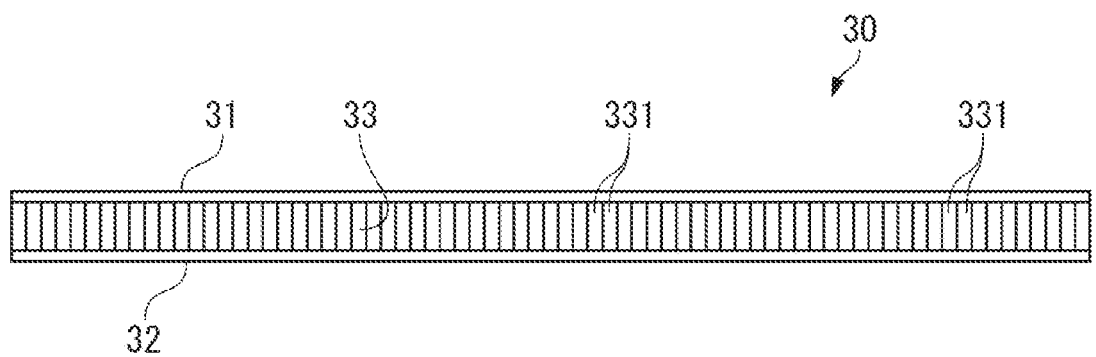
FIG. 6 is a cross-sectional diagram illustrating the insertion sheet that is cut along a line VII in FIG. 6 and developed.

As illustrated in FIG. 5 and FIG. 6, the insertion sheet 30 includes two surface members 31 and 32 and a honeycomb core 33 in order to meet the above-described requirement while providing sufficient thermal resistance. The two surface members 31 and 32 respectively forms a front surface and a back surface of the insertion sheet 30, and the honeycomb core 33 supports the surface members 31 and 32.

The insertion sheet 30 is formed as a honeycomb sandwich panel in which the honeycomb core 33 is sandwiched between the surface members 31 and 32 in the thickness direction.

A plurality of insertion holes 301 into which respective rivets 15 are inserted are provided in the insertion sheet 30.

The honeycomb core 33 has a honeycomb structure formed of an aggregate of cells 331 each having a polygonal cross-sectional surface, and has a planar dimension equivalent to those of the surface members 31 and 32.

Each of the cells 331 formed in the honeycomb core 33 includes an airgap.

The honeycomb core 33 and the surface members 31 and 32 may be each formed of an appropriate material that has thermal resistance withstanding the heat of the bleed air and rigidity bearing the load of the fastening by the rivets 15. The honeycomb core 33 and the surface members 31 and 32 may be each formed of the material same as that of the first part 21 of the insertion sheet 20 mentioned above.

The honeycomb core 33 and the surface members 31 and 32 may be formed of the same material as one another or different materials from one another.

The honeycomb core 33 and the surface members 31 and 32 bear the load of the fastening by the rivets 15, as a whole.

In addition, the thermal conductivity of the entire insertion sheet 30 is lower than the thermal conductivity of the material used for the honeycomb core 33 and the surface members 31 and 32 because of the air existing in the cells 331 (hollow parts) of the honeycomb core 33.

The thermal conductivity of the entire insertion sheet 30 is, for example, 0.1 W/(m·K) or less.

Since the insertion sheet 30 includes a lot of airgaps, it is possible to reduce its weight as compared with a typical joint sheet.

The insertion sheet 30 has the hollow parts while securing the rigidity withstanding the load of the fastening by the honeycomb structure, which allows for reduction of the thermal conductivity as compared with the typical joint sheet, thereby providing sufficient thermal resistance between the flange 12 and the partition panel 71. This makes it possible to maintain the partition panel 71 at the allowable temperature or less.

When the fastening pressure is high, a solid member that is formed of a material similar to that of the first part 21 may be provided around the insertion hole 301 in order to enhance rigidity.

Next, a part where the bleed duct 10 penetrates through the pressure partition wall 5 is described with reference to FIG. 7.

The pressure partition wall 5 includes a pressure panel 51 and a plurality of unillustrated ribs that reinforce the pressure panel 51.

A through hole 50 that penetrates through the pressure panel 51 in a thickness direction is provided in the pressure panel 51. The bleed duct 10 passes through the through hole 50. The pressure panel 51 is formed of a metal material such as an aluminum alloy. The through hole 50 has a hole diameter slightly larger than a diameter of an outer periphery of the pipe of the bleed duct 10.

The bleed duct 10 has annular flanges 14. Each of the flanges 14 projects outward from the outer periphery 11A of the duct body 11 in a radial direction and is fastened to the pressure panel 51. Each of the flanges 14 is formed of a metal material such as stainless steel, as with the duct body 11.

The flanges 14 that are provided at respective ends of the duct bodies 11 serving as the pipes configuring the bleed duct 10 are abutted on each other and fastened by the rivets 15.

The flanges 14 abutted on each other are fastened, by the rivets 15, to a circumference 50A of the through hole 50 of the pressure panel 51 at a plurality of positions in a circumferential direction. Each of the rivets 15 penetrates through the abutted flanges 14 and the pressure panel 51.

An insertion sheet 27 is inserted between an end surface of the flange 14 and a surface of the pressure panel 51.

The insertion sheet 27 that is favorably used for a fastening position requiring airtightness is described below.

Figure 7:
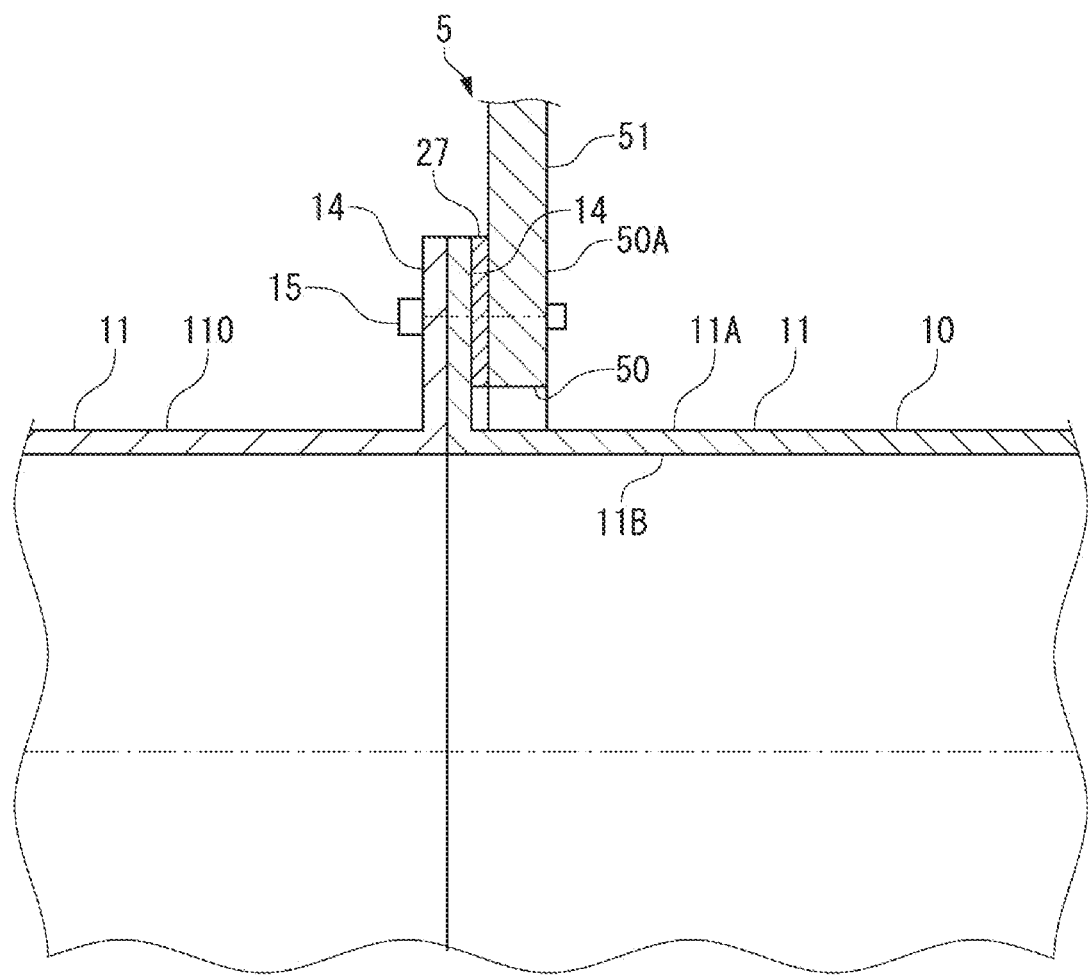
FIG. 7 is an enlarged view illustrating a part (denoted by V) in FIG. 1 where the bleed duct penetrates through the pressure partition wall.

The insertion sheet 27 illustrated in FIG. 7 is formed by impregnating the felt of the second part 22 of the insertion sheet 20 (FIG. 3) mentioned above with a resin, followed by curing. The gaps of the glass fibers of the second part 22 are filled with the resin, which provides a sealing function to the insertion sheet 27.

Note that the insertion sheet 27 may be used at the fastening part of the flanges 12 and the partition panel 71.

According to the present embodiment, the insertion sheet 20 (or 30) and the insertion sheet 27 make it possible to sufficiently suppress heat transfer through the fastening position while providing thermal resistance withstanding the heat of the bleed air and rigidity suited to the load of the fastening. This makes it possible to suppress the temperature of the pressure partition wall 5 and the partition wall 7 that are primary structural members of the aircraft 1, to the respective allowable temperature or less.

Since the insertion sheets 20 (or 30) and 27 according to the present embodiment each include a lot of airgaps, it is possible to sufficiently suppress heat transfer from the flanges 12 and 14 of the bleed duct 10 to the structural members.

Such countermeasures against heat are meaningful in terms of weight restriction of the aircraft 1 because of not requiring change of the thickness of the structural member.

Figure 8A:
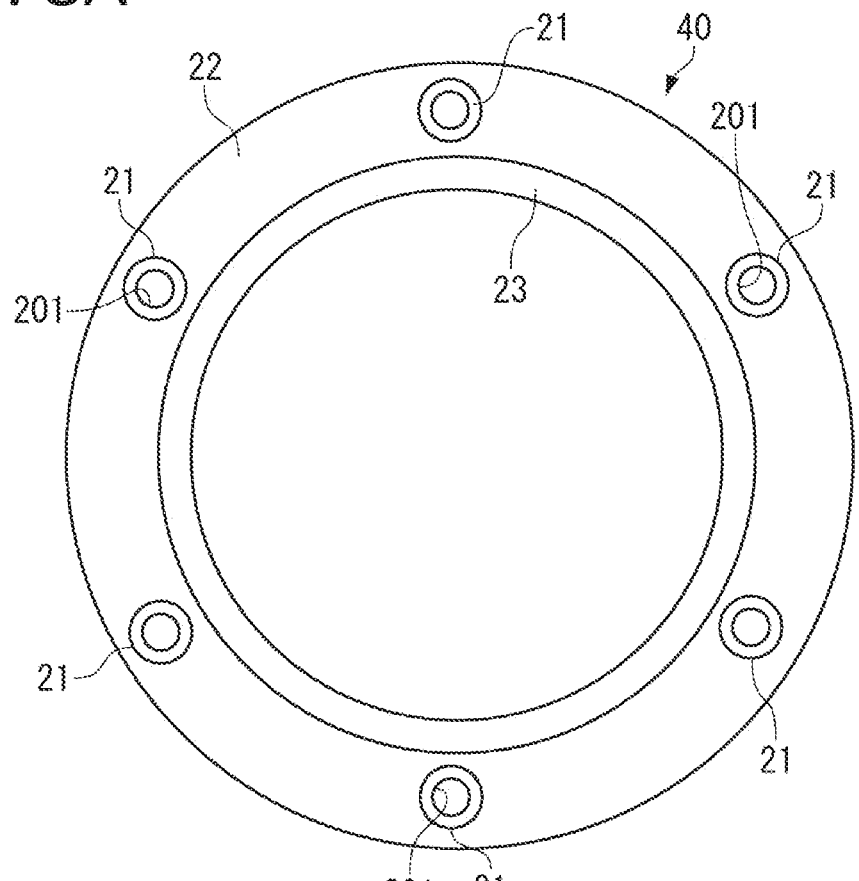
FIGS. 8A and 8B are diagrams each illustrating another modification of the insertion sheet.

FIG. 8A is a diagram illustrating an insertion sheet 40 that includes an annular third part 23 in addition to the structure of the insertion sheet 20 (FIG. 3).

The insertion sheet 40 integrally includes the first parts 21 and the second part 22 that are provided in the above-described insertion sheet 20, and the third part 23 (a sealing part). The third part 23 is continuous over the entire circumference of the flange on inner peripheral side than the first parts 21 and the second part 22, and is tightly fitted to the flange and the structural member. The insertion sheet 40 has a sealing function by the third part 23.

The third part 23 may be formed of a fluorine-based resin material similar to that of the first part 21. The above-described CLINSIL® may be used for the third part 23.

As mentioned above, the first part 21 may be integrated with the second part 22 by being driven into the prepared hole of the second part 22. Likewise, forming the second part 22 to have an inner diameter smaller than an outer diameter of the third part 23 and driving the third part 23 into the second part allow for integration of the second part 22 and the third part 23.

When the insertion sheet 40 is inserted between the flange 14 of the bleed duct 10 and the pressure panel 51 (FIG. 7), the third part 23 is tightly fitted to the flange 14 and the pressure panel 51 therebetween. Therefore, the third part 23 seals the gap between the flange 14 and the pressure panel 51.

Figure 8B:
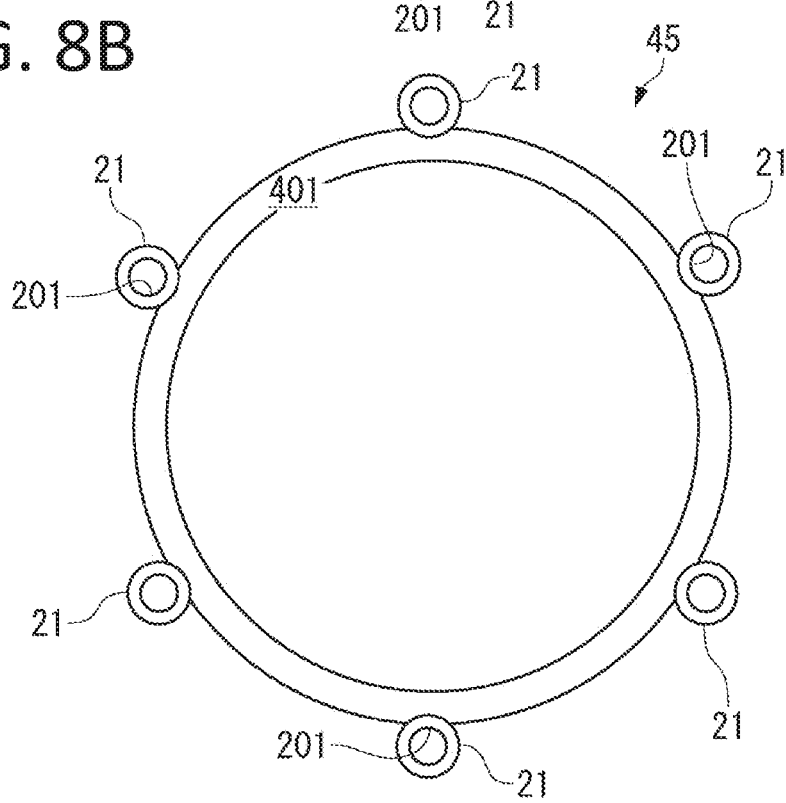

Moreover, as an example illustrated in FIG. 8B, an insertion sheet 45 having a sealing function may be formed of an annular sealing part 401 and the plurality of first parts 21 that are arranged on the outer periphery of the sealing part 401.

The first parts 21 are provided near the respective insertion holes 201 into which the rivet 15 fastening the flange 14 and the pressure panel 51 illustrated in FIG. 7 is inserted.

The sealing part 401 is continuous over the entire circumference of the flange 14 on the inner peripheral side of the insertion hole 201 and is tightly fitted to the flange 14 and the pressure panel 51. The sealing part 401 connects the first parts 21 with one another and seals the gap between the flange 14 and the pressure panel 51.

Each of the first parts 21 projects outward from an outer peripheral edge of the sealing part 401 in a radial direction.

When the insertion sheet 45 illustrated in FIG. 8B is disposed between the flange 14 and the pressure panel 51, an airgap including the gap between the first parts 21 is formed between the flange 14 and the pressure panel 51 on the outer peripheral side of the sealing part 401.

The insertion sheet 45 makes it possible to provide sufficient thermal resistance between the flange 14 and the pressure panel 51 by the airgap existing between the flange 14 and the pressure panel 51 while the first parts 21 bear the load of the fastening and the sealing part 401 that extends among the first parts 21 seals the gap between the flange 14 and the pressure panel 51.

In the first embodiment, using a bolt and a nut in place of the rivets 13 and 15 makes it possible to detachably fasten the flanges 12 and 14 of the bleed duct 10 to the structural members.

As a result, the insertion sheets 20 or 30 is easily replaced through loosing the bolt and the nut in maintenance.

Figure 9A:
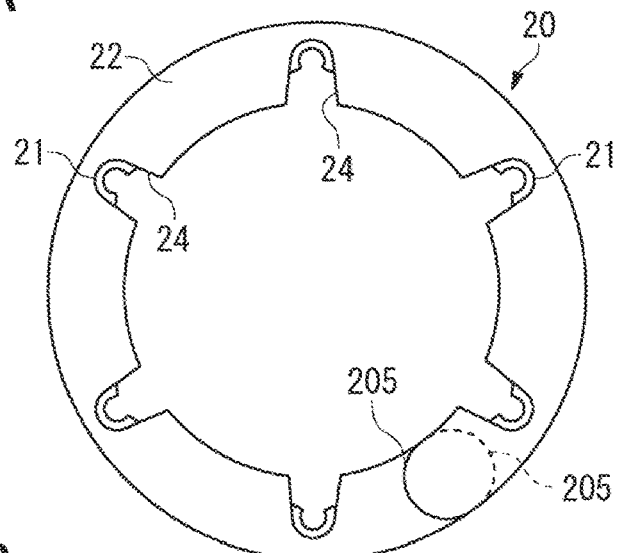
FIGS. 9A to 9C are diagrams illustrating respective other modifications of the insertion sheet.
Figure 9B:
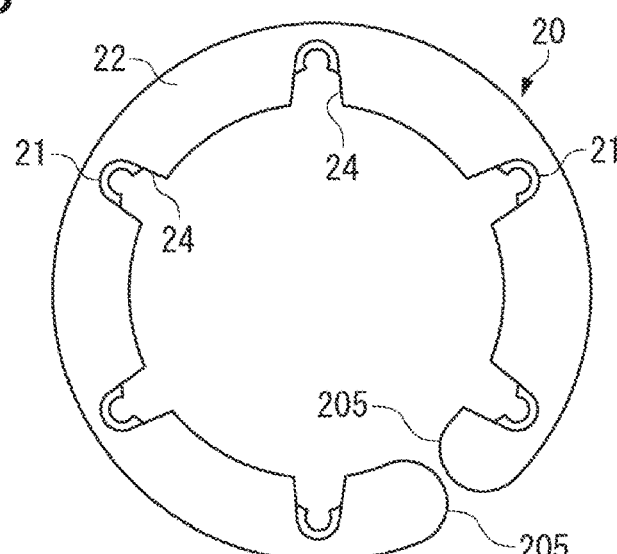
Figure 9C:
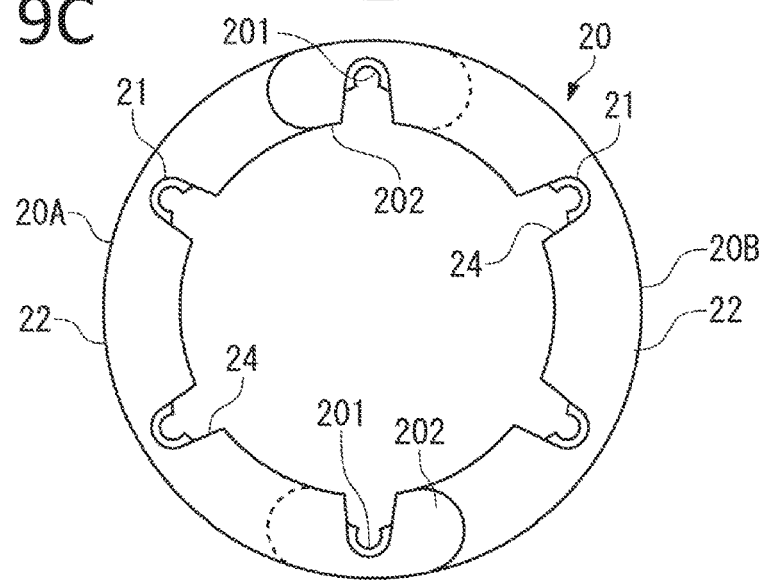

In the terms of maintenance, the insertion sheet 20 may be preferably formed in a C-character shape as illustrated in FIG. 9A or FIG. 9B, or may be preferably divided into two or more parts in the circumferential direction as illustrated in FIG. 9C. The insertion sheet 30 may also be preferably formed in a similar shape.

In addition, a portion of the inner periphery of the first part 21 is chipped, and a cutout 24 is formed at the tipped portion on the inner peripheral side of the insertion sheet 20.

Accordingly, the insertion sheet 20 may be easily pulled from or easily inserted into the gap in a radial direction by loosing the bolt that fastens the flange 12 or 14 and the structural member, without detaching the bolt.

Note that, even if the cutout 24 is not provided, the insertion sheet 20 is formed in the C-character shape or divided into two or more parts in the circumferential direction, which facilitates exchange of the insertion sheet 20 because the structure eliminates the need for detachment of a portion of the pipes configuring the bleed duct 10 and detachment of the bolt is enough to the exchange.

As illustrated in FIG. 9A, both ends 205 of the C-character shaped insertion sheet 20 may be preferably overlapped with each other in the thickness direction of the sheet, and the insertion sheet 20 may be preferably continuous over the entire circumference of the flange 12 or 14. This allows uniform application of the fastening pressure to the entire circumference of the flange 12 or 14.

As illustrated in FIG. 9B, however, a portion of the insertion sheet 20 in the circumferential direction may be slightly chipped.

Two parts 20A and 20B illustrated in FIG. 9C are overlapped with each other at respective adjacent ends, and an insertion hole 201 into which the same rivet 13 is inserted is formed in an overlapped region 202.

The insertion sheet 20 and the like mentioned above may be used at a position where the bleed duct 10 penetrates through structural members other than the partition wall 7 and the pressure partition wall 5, for example, structural members such as a rib, a stringer, and a frame.

Second Embodiment

Figure 10A:
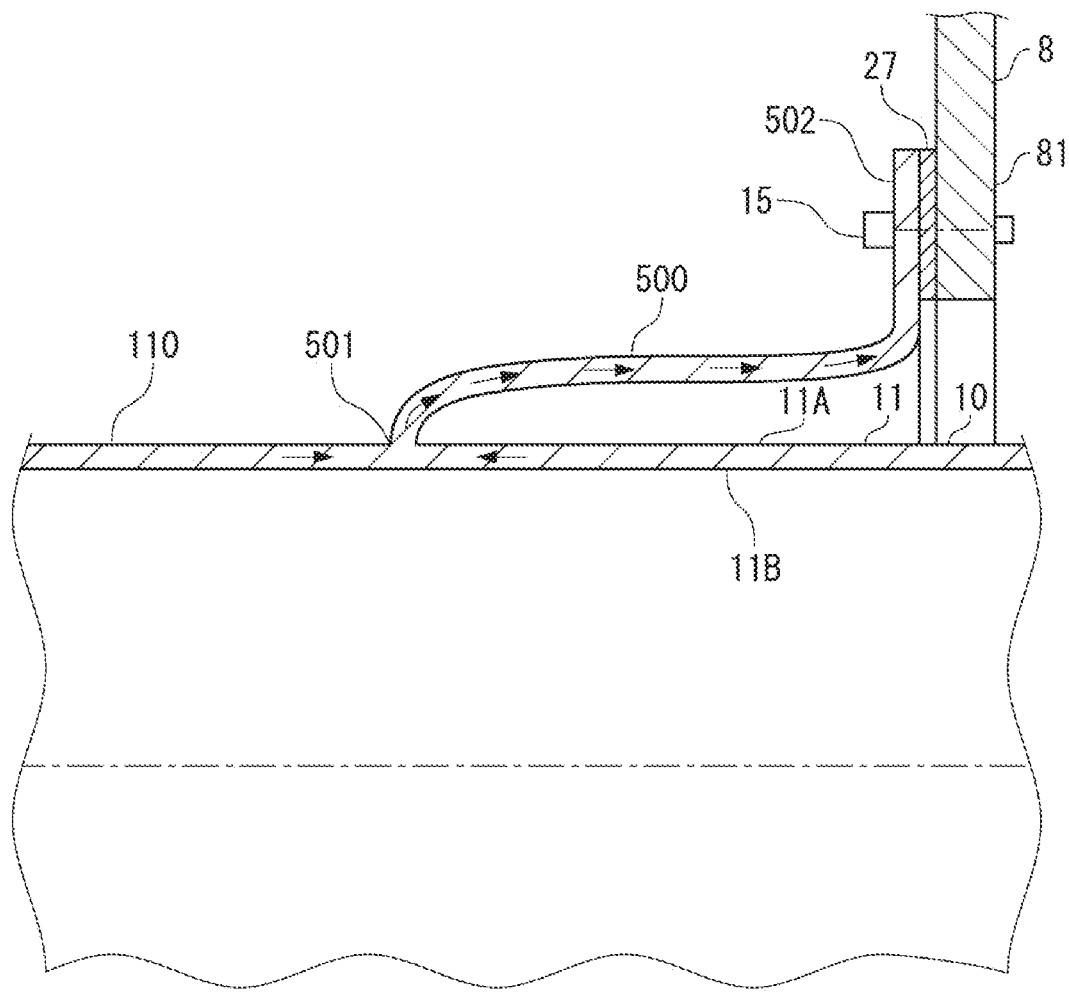
FIGS. 10A and 10B are vertical cross-sectional diagrams each illustrating a bleed duct according to a second embodiment.

Next, a second embodiment of the present invention is described with reference to FIG. 10A.

The second embodiment has a main feature in the configuration of a fastening section 500 of the bleed duct 10 that is fastened to the structural member.

The bleed duct 10 penetrates through the structural member 8 of the aircraft 1, as with the first embodiment, and is fastened to the structural member 8 by the rivets 15 at the fastening section 500 provided in the duct body 11. The structural member 8 may be, for example, the panel 71 of the partition wall 7 or the panel 51 of the pressure partition wall 5.

The fastening section 500 according to the second embodiment extends from the outer periphery 11A of the duct body 11 toward a fastening region 81 at a position that is separated from the part where the bleed duct 10 is fastened to the fastening region 81 of the structural member 8 by the rivets 15, in the radial direction and the axial direction (a flow direction of the bleed air) of the bleed duct 10.

The fastening section 500 is provided over the entire circumference of the bleed duct 10.

The fastening section 500 is so formed as to gradually increase in diameter from a proximal end portion 501 that is continuous to the outer periphery 11A, toward a distal end portion 502 that is fastened to the fastening region 81. The distal end portion 502 is formed in a flange shape.

The fastening section 500 provides sufficient thermal resistance between the bleed duct 10 and the structural member 8 because the path (illustrated by an arrow) of the heat transfer from the outer periphery 11A to the fastening region 81 is longer than the typical flange 12 (FIG. 2) that projects from the outer periphery 11A along the radial direction.

Disposing the insertion sheet 20 or 27 according to the first embodiment between the distal end portion 502 and the fastening region 81 in addition to providing the fastening section 500 that forms the long heat transfer path makes it possible to provide more sufficient thermal resistance between the bleed duct 10 and the structural member 8. The same effects are obtainable in the following embodiments.

The fastening section 500 according to the present embodiment extends while smoothly curving. Therefore, the long path for heat transfer is secured and a heat dissipation area is widely secured, as compared with a case in which the fastening section is formed in a flat shape.

The heat transfer path from the proximal end portion 501 to the distal end portion 502 is secured to be longer in the axial direction than in the radial direction. A distance from the proximal end portion 501 to the distal end portion 502 in the radial direction is set to be substantially equal to a distance from an inner end 12A to an outer end 12B of the flange 12 (FIG. 2).

The fastening section 500 is not necessarily curved, and may be configured of a combination of linear segments.

Figure 10B:
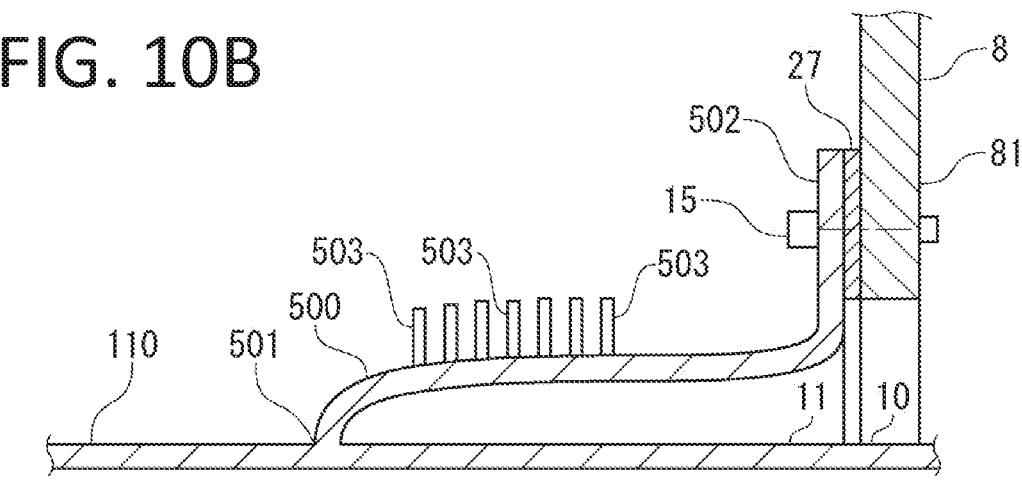

In the present embodiment, a plurality of fins 503 that each project from the surface of the fastening section 500 may be preferably provided as illustrated in FIG. 10B because the fins 503 achieve dissipation of the heat transferred through the fastening section 500. The fins 503 may be provided as a flange over the entire circumference of the fastening section 500.

According to the present embodiment, the fastening section 500 that forms the heat transfer path longer than the flange makes it possible to sufficiently suppress heat transfer to the structural member 8. Therefore, it is possible to suppress the temperature of the structural member 8 to the allowable temperature or less without increasing the thickness of the structural member 8.

Third Embodiment

Figure 11:
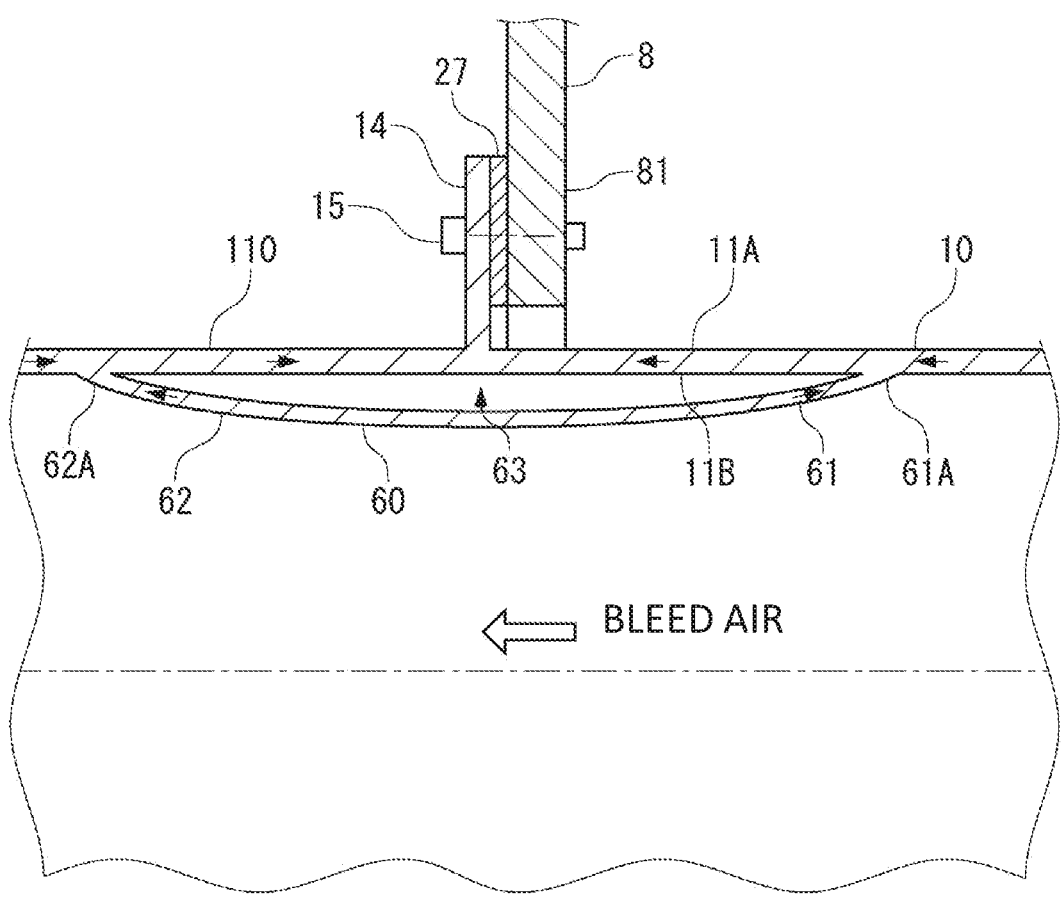
FIG. 11 is a vertical cross-sectional diagram illustrating a bleed duct according to a third embodiment.

Next, a third embodiment of the present invention is descried with reference to FIG. 11.

The bleed duct 10 according to the third embodiment is fastened, by the rivets 15, to the structural member 8 through the flange 14 provided in the bleed duct 10, as with the first embodiment.

The bleed duct 10 according to the third embodiment includes an annular wall body 60. The wall body 60 extends along an inner periphery 11B of the duct body 11 from an upstream side to a downstream side of the flange 14. The wall body 60 is provided over the entire circumference of the bleed duct 10.

The wall body 60 includes an upstream portion 61 and a downstream portion 62. The upstream portion 61 is continuous to the inner periphery 11B on the upstream side of the flange 14. The downstream portion 62 is continuous to the inner periphery 11B on the downstream side of the flange 14. The upstream portion 61 and the downstream portion 62 are fastened to the inner periphery 11B through welding or the like, and the wall body 60 and the inner periphery 11B include a sealed gap 63 therebetween.

Both the upstream portion 61 and the downstream portion 62 may be preferably smoothly continuous to the inner periphery 11B to cause the bleed air to smoothly flow. A cross-sectional area of the flow path of the bleed air is gradually varied from the upstream side of the wall body 60 to the downstream side thereof.

The gap 63 functions as a heat insulation layer using the air, which causes the heat of the bleed air in the bleed duct 10 to reach the flange 14 from an end 61A and an end 62A through the outer wall 110 of the duct body 11, as the path of the heat transfer illustrated by an arrow.

A fin similar to the fin 503 illustrated in FIG. 10B may be preferably provided on the outer periphery 11A of the outer wall 110 because the fin achieves heat dissipation.

According to the present embodiment, the gap 63 functioning as the heat insulation layer causes the heat of the bleed air to transfer from the end 61A and the end 62A to the flange 14 with long stroke. This makes it possible to provide sufficient thermal resistance between the bleed duct 10 and the structural member 8. Therefore, it is possible to suppress the temperature of the structural member 8 to the allowable temperature or less without increasing the thickness of the structural member 8.

Further, it is possible to deal with the temperature increase of the structural member 8 only by changing the inside of the bleed duct 10 without changing the dimension of the connection between the fastening region 81 of the structural member 8 and the flange 14.

Decreasing the pressure inside the gap 63 of the present invention allows for enhancement of the heat insulation property of the gap 63.

Furthermore, an appropriate heat insulation material may be disposed inside the gap 63.

In the present embodiment, a temperature sensor may preferably detect whether the bleed air flowing through the bleed duct 10 is not leaked to the gap 63, and alarm may be preferably generated when the bleed air is leaked. For example, the temperature sensor may be provided at the end 61A of the upstream portion 61 and the end 62A of the downstream portion 62 of the wall body 60 that is welded to the inner periphery 11B.

Fourth Embodiment

Figure 12A:
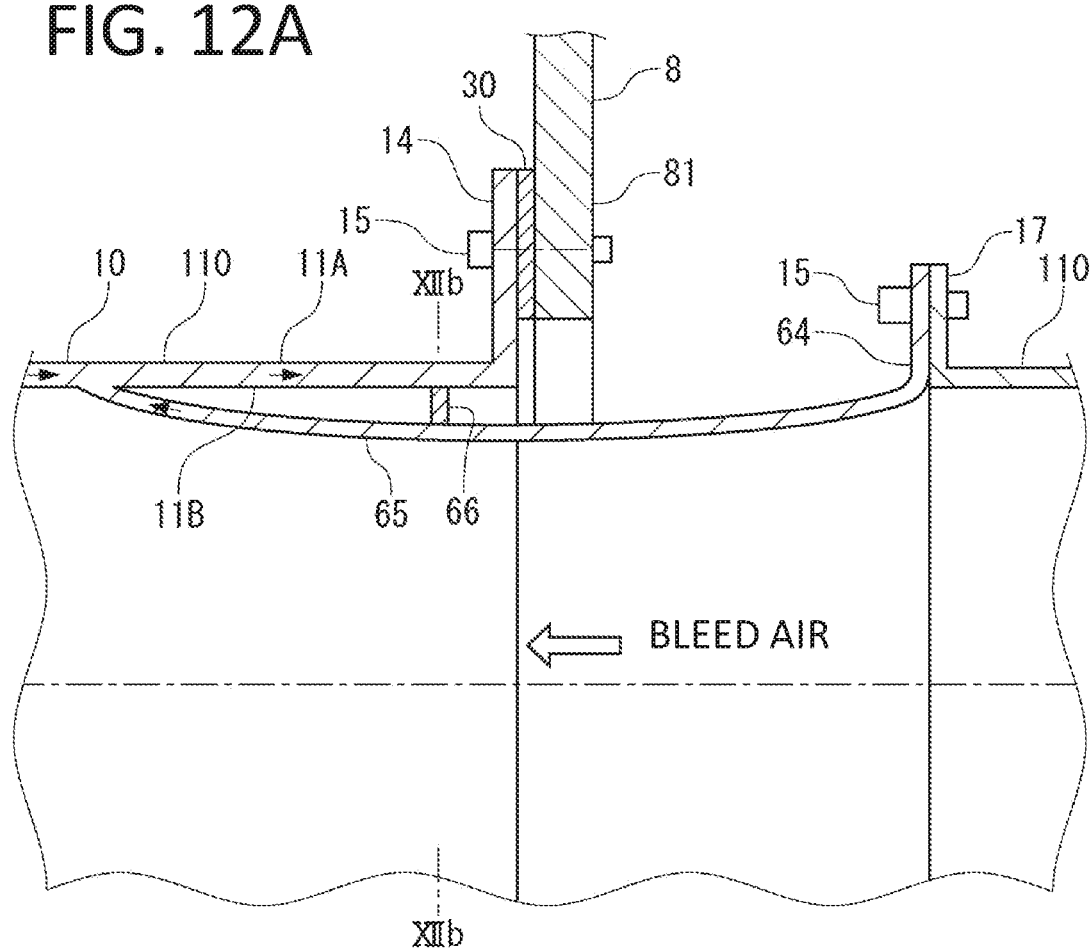
FIGS. 12A and 12B are vertical cross-sectional diagrams each illustrating a bleed duct according to a fourth embodiment.
Figure 12B:
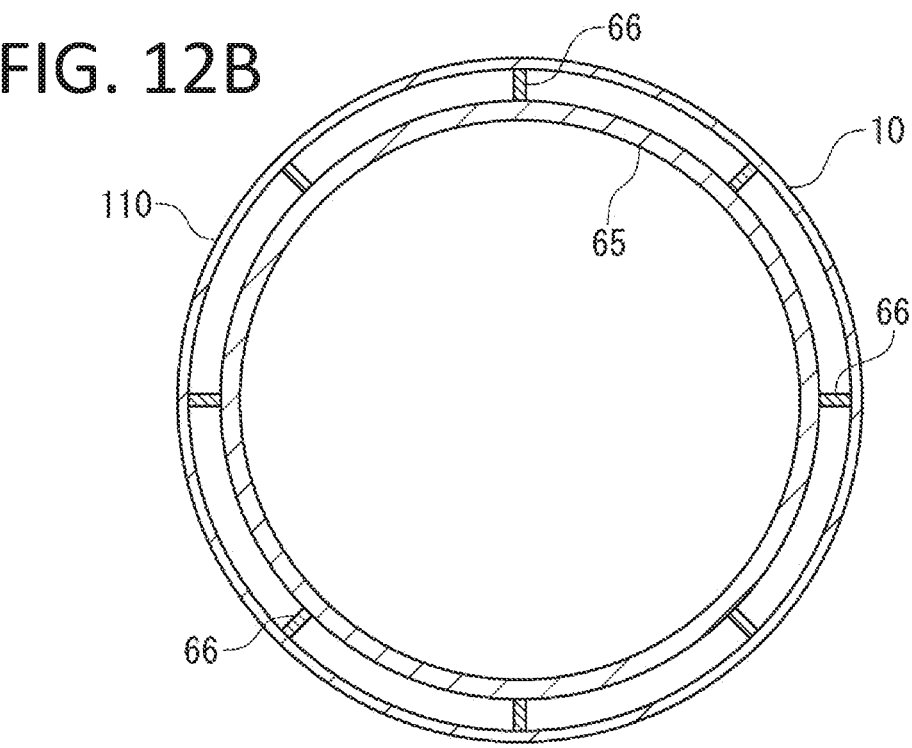

Next, a fourth embodiment of the present invention is described with reference to FIG. 12.

Differences with the third embodiment are mainly described below.

In the fourth embodiment, a wall body 65 provided in the bleed duct 10 is located on inner side of the inner periphery 11B on the downstream side of the flange 14, and is open to the outside of the bleed duct 10 without being surrounded by the outer wall 110 on the upstream side of the flange 14. The flange 14 that is fastened to the structural member 8 is provided at an end of the outer wall 110 that surrounds a downstream portion of the wall body 65.

To support, near the flange 14, the wall body 65 that is supported in a cantilever manner by the inner periphery 11B on the downstream side, a member 66 (also refer to FIG. 12B) that couples the outer wall 110 with the wall body 65 may be preferably provided.

An end 64 of the wall body 65 on the upstream side is fastened to the flange 17 of the outer wall 110 that is separated on the upstream side from the flange 14. In this case, the flange-shaped end 64 of the wall body 65 and the flange 17 of the outer wall 110 are fastened by the rivets 15.

Also in the present embodiment, since the heat of the bleed air transfers from the end to the flange 14 with long stroke as illustrated by an arrow, it is possible to provide sufficient thermal resistance between the bleed duct 10 and the structural member 8.

Further, providing a fin on the outer periphery 11A on the downstream side of the flange 14 makes it possible to achieve heat dissipation.

Other than the above, the configurations described in the above-described respective embodiments may be selected or any of the configurations may be appropriately modified without departing from the scope of the present invention.

The insertion sheet according to the present invention may be provided at any position where the duct is fastened to the structural member, in addition to the part where the duct penetrates through the structural member.

Figure 13A:
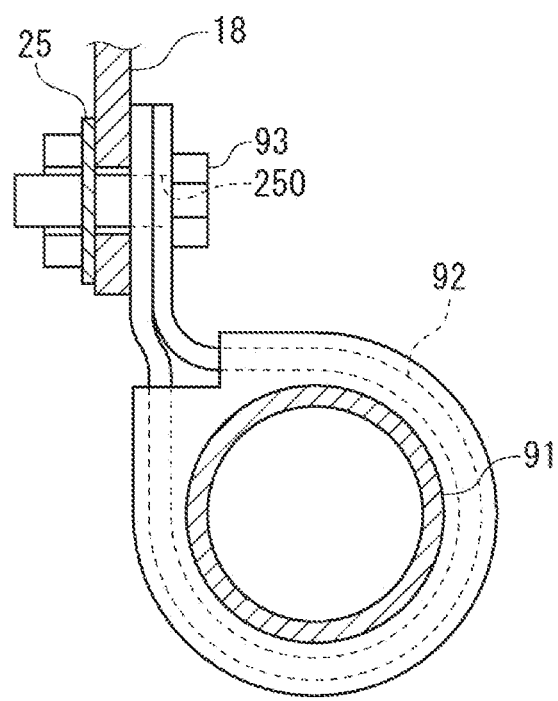
FIGS. 13A and 13B are schematic diagrams each illustrating an insertion sheet according to a modification of the present invention.

For example, as illustrated in FIG. 13A, when a duct 91 is held to a structural member 18 by a clamp-shaped holding member 92, an insertion sheet 25 may be disposed between the holding member 92 and the structural member 18. Examples of the structural member 18 may include a stringer and a frame.

Figure 13B:
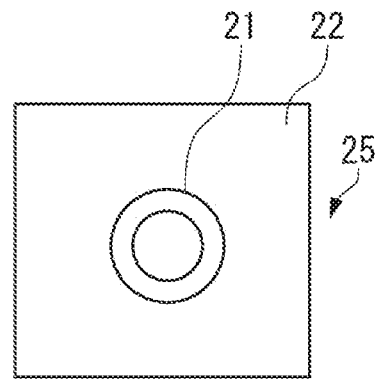

As illustrated in FIG. 13B, the insertion sheet 25 includes the first part 21 and the second part 22. The first part 21 is disposed around an insertion hole 250 of the structural member 18 into which a fastener 93 is inserted. The second part 22 is disposed around the first part 21.

The insertion sheet 25 also makes it possible to suppress heat transfer from the holding member 92 to the structural member 18, and to accordingly maintain the temperature of the structural member 18 at the allowable temperature or less.

Further, in place of the insertion sheet 25, an insertion sheet that is a honeycomb sandwich panel including a honeycomb core and a surface member as with the above-described insertion sheet 30 or an insertion sheet having a sealing property as with the above-described insertion sheets 27 and 40 may be used.

What is claimed is:

1. A fastening structure of an aircraft comprising:
   a structural member of the aircraft;
   a high-temperature duct of the aircraft penetrating through the structural member and allowing a fluid at temperature higher than allowable temperature of the structural member to flow inside the duct, the duct having a flange fastened to the structural member by fastening members; and
   an insertion sheet being inserted between the flange of the duct and the structural member, the insertion sheet having insertion holes into which the fastening members are respectively insertable, the insertion sheet comprising:
      first parts that are disposed near the respective insertion holes, and
      a second part integrally attached to the first parts that extends among the first parts,
   wherein the first parts are configured to bear a load of fastening,
   wherein the second part has thermal conductivity lower than thermal conductivity of the first parts, and
   wherein each of the first parts includes a resin material.

2. The fastening structure according to claim 1, wherein each of the first parts has a cylindrical shape, and an inner periphery of each of the first parts forms an inner wall of each of the insertion holes.

3. The fastening structure according to claim 1, wherein the second part defines an airgap.

4. The fastening structure according to claim 3, wherein the material included in the second part includes a porous material.

5. The fastening structure according to claim 1, wherein the second part connects the first parts such that the first parts are inseparable from one another.

6. The fastening structure according to claim 1, wherein the second part includes a felt in a sheet shape.

7. The fastening structure according to claim 1, wherein each of the first parts is continuously formed over the entire circumference of the insertion hole, or intermittently formed in the circumferential direction of the insertion hole.

8. The fastening structure according to claim 1, wherein the insertion sheet is disposed in an entirety of a fastening region where an end surface of the flange and a surface of the structure member face each other.

9. The fastening structure according to claim 1, wherein the insertion sheet is formed in an annular shape, the insertion sheet further comprises a sealing part that is disposed at an inner-most peripheral side of the insertion sheet, and is tightly fitted to the flange and the structural member.

10. An insertion sheet inserted between a high-temperature duct and a structural member of an aircraft, the insertion sheet being inserted between a flange of the duct and the structural member fastened to the flange, the duct penetrating through the structural member and allowing a fluid at temperature higher than allowable temperature of the structural member to flow inside the duct, the insertion sheet formed in an annular shape, the insertion sheet comprising:

first parts that are disposed near respective insertion holes into which fastening members are respectively inserted, and bear a load of fastening, the fastening members provided at a plurality of positions in the insertion sheet; and a sealing part that is disposed at an inner-most peripheral side of the insertion sheet, and is tightly fitted to the flange and the structural member, wherein each of the first parts projects outward from an outer peripheral edge of the sealing part in a radial direction, and an airgap is provided between adjacent first parts.

11. An insertion sheet inserted between a high-temperature duct and a structural member of an aircraft, the insertion sheet being inserted between a flange of the duct and the structural member fastened to the flange, the duct penetrating through the structural member and allowing a fluid at temperature higher than allowable temperature of the structural member to flow inside the duct, the insertion sheet including a honeycomb structure that is configured of an aggregate of cells each having a polygonal cross-sectional surface.

12. An aircraft comprising:

an airframe;

a structural member;

a high-temperature duct penetrating through the structural member and allowing a fluid at temperature higher than allowable temperature of the structural member to flow inside the duct, the duct having a flange fastened to the structural member by fastening members; and an insertion sheet being inserted between the flange of the duct and the structural member, the insertion sheet having insertion holes into which the fastening members are respectively insertable, the insertion sheet comprising:

first parts that are disposed near the respective insertion holes, and a second part integrally attached to the first parts that extends among the first parts, wherein the first parts are configured to bear a load of fastening, wherein the second part has thermal conductivity lower than thermal conductivity of the first parts, and wherein each of the first parts includes a resin material.

* * * * *